Figure 1:
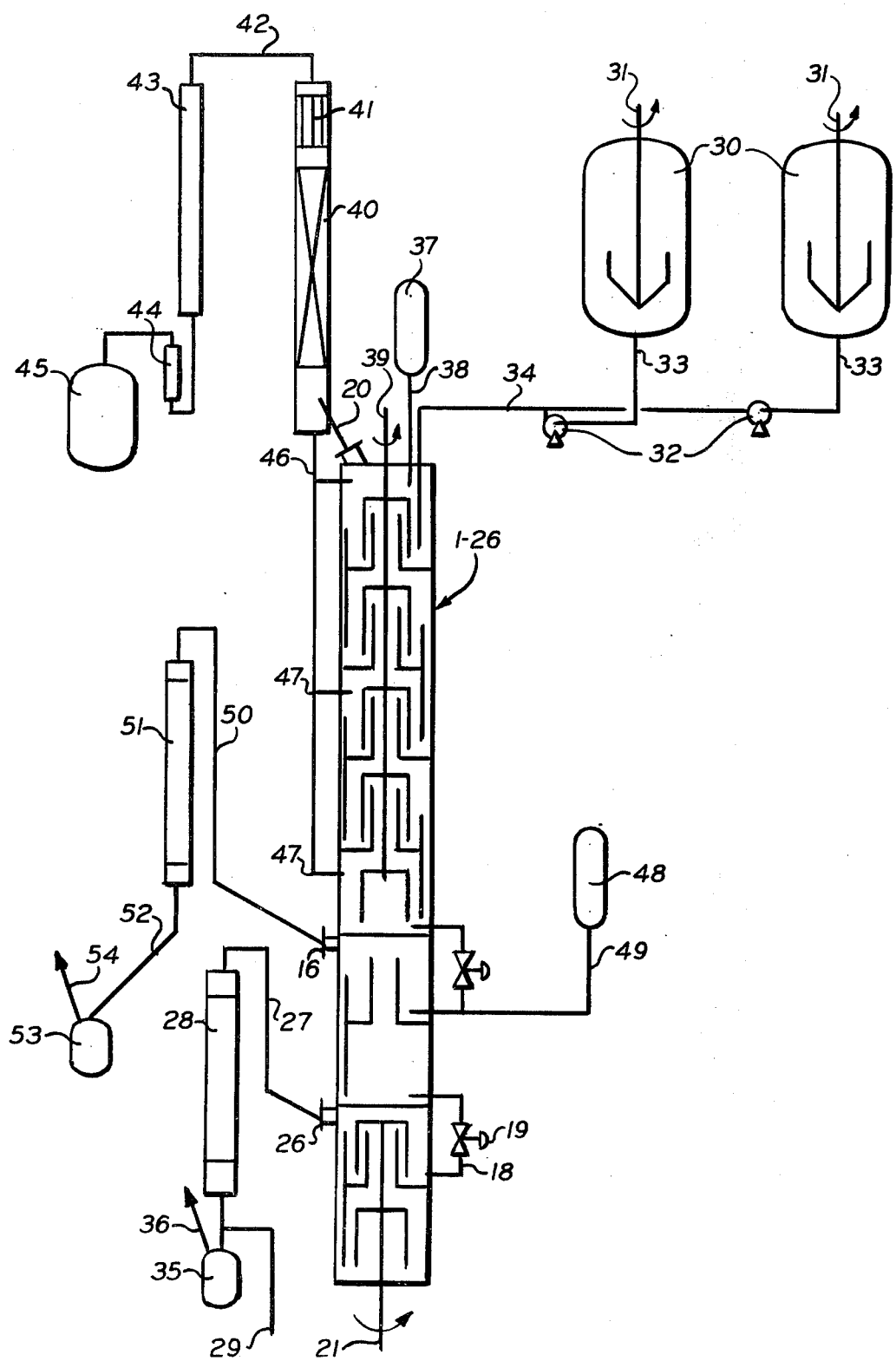

United States Patent [19]

Janssen, deceased et al.

[11] 4,138,544

[45] Feb. 6, 1979

[54] PREPARATION OF POLYCONDENSATE BY ONE-STEP MELT CONDENSATION IN A VACUUM

[75] Inventors: Paul Janssen, deceased, late of Bensberg-Refrath, Fed. Rep. of Germany, by Almuth Janssen, legal representative; Günther Meyer, Troisdorf-Sieglar, Fed. Rep. of Germany; Klaus Thewalt, Witten-Bommern, Fed. Rep. of Germany; Reinhard Schmidt, Witten, Fed. Rep. of Germany

[73] Assignee: Dynamit Nobel Aktiengesellschaft, Cologne, Fed. Rep. of Germany

[21] Appl. No.: 751,916

[22] Filed: Dec. 16, 1976

[30] Foreign Application Priority Data

Dec. 20, 1975 [DE] Fed. Rep. of Germany ....... 2557580

[51] Int. Cl.$^2$ ............................................. C08G 63/34
[52] U.S. Cl. .................................. 528/272; 260/95 R; 260/95 C; 528/279; 528/480
[58] Field of Search .................. 260/75 M, 95 R, 95 C

[56] References Cited

U.S. PATENT DOCUMENTS

| 3,174,830 | 3/1965 | Watzl et al. .................. 260/75 M X |
| 3,401,150 | 9/1968 | Carney .............................. 260/75 M |

*Primary Examiner*—Lucille M. Phynes
*Attorney, Agent, or Firm*—Sprung, Felfe, Horn, Lynch & Kramer

[57] ABSTRACT

An improvement in the method of preparing a linear polycondensate of high molecular weight wherein a precondensate is initially formed and thereafter subjected to a one-step melt condensation in a vacuum while cleavage products are removed therefrom, the reaction mass being exposed in a thin layer by means of a stirrer to the reaction conditions, the improvement residing in employing as the precondensate a molten precondensate having an average condensation degree of at least 3, said precondensate being introduced into the melt condensation zone continuously while the cleavage products are driven off at the particular optimum, product-specific condensation temperature, the contents of the melt condensation zone being subjected to the action of a rotary stirrer until the melt has a melt viscosity of 1000 to 15000 poises and continuously withdrawing molten polycondensate in accordance with the speed of the reaction. Also disclosed is an apparatus in which the polycondensation is effected including an offset withdrawal outlet containing an auger which can enter a funnel disposed between the outlet and the polycondensation zone. Also disclosed is an upright multi-chamber vessel in which the precondensate is formed wherein the chambers are disposed one over the other. Some of the upper chambers are equipped with means for maintaining a normal or elevated pressure while some of the lower chambers are equipped with means for imposing a partial vacuum on the contents.

26 Claims, 14 Drawing Figures

FIG. 3.
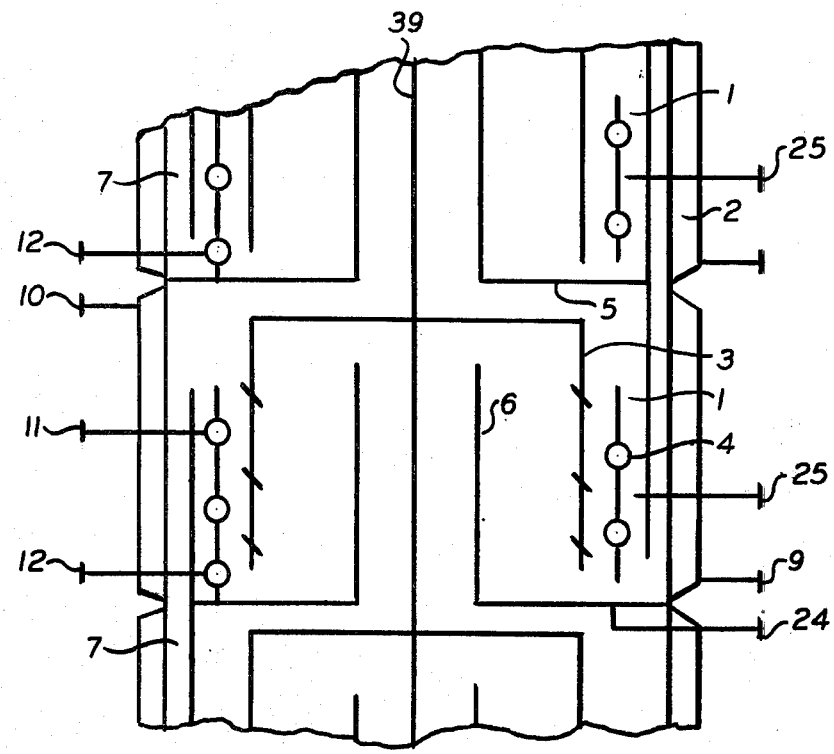
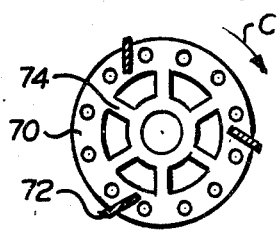
FIG. 6a.
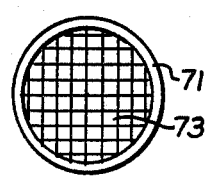
FIG. 6b.
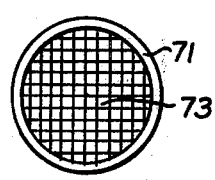
FIG. 6c.
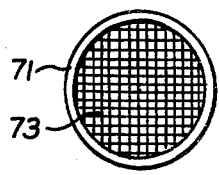
FIG. 6d.
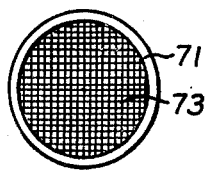
FIG. 6e.
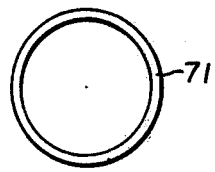
FIG. 6f.
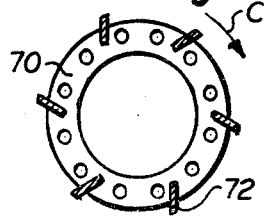
FIG. 6g.
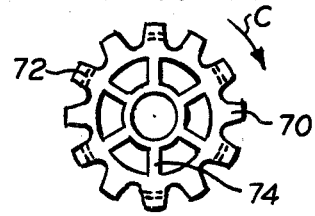
FIG. 6h.

THE PREPARATION OF POLYCONDENSATE BY ONE-STEP MELT CONDENSATION IN A VACUUM

BACKGROUND OF THE INVENTION

1. Field of the Invention

This invention relates to a method of preparing linear polycondensates of high molecular weight, especially linear polyesters by the further condensation of precondensates in the melted in an one-step reactor equipped with means for removing cleavage products by the application of a vacuum or partial vacuum, the reaction mass being exposed in a thin layer to the reaction conditions by means of a stirrer.

This invention further relates to an apparatus in which precondensates are further condensed to form linear polycondensates.

This invention still further relates to a novel upright multi-chamber reactor in which precondensates are formed. The invention further relates to the combination of a precondensate reactor and an one-step polycondensate reactor.

2. Discussion of the Prior Art

Both discontinuous and continuous methods are known. Discontinuous methods have the disadvantage especially that —at least in the case of production in larger units—it is not possible to overcome entirely the problems which are encountered in achieving, to melt viscosities above 4500 poises, the stirring action that is necessary to assure an adequate outgassing of the volatile cleavage products.

In conventional stirring tanks, high shear forces are produced at high rotatory speeds, which damage the melt and result in a very high specific power consumption in the stirrer motor. At low rotatory speeds, the stirring action and surface-exposing action are so minimal that the melt is exposed to great thermal stress by prolongation of the reaction.

For example, it is reported that, for the polycondensation of a polyester precondensate for a laboratory batch of 55 grams, approximately 30 minutes are required. But if one kilogram of the same precondensate is put in, about 60 to 90 minutes are required in order to attain the same degree of condensation. At the same time, maximum carboxyl group contents of 28 mass equivalents per kilogram are found in the laboratory batch, while the carboxyl group contents amount to from 60 to 80 mass equivalents per kilogram when the process is performed in large autoclaves and the polycondensation is carried to viscosities of $\eta_{red}$ 1.7. (Chimia 28 (1974) No. 9, pp. 544 sqq.) These high carboxyl group contents are due to the fact that, as the viscosity increases, or the degree of polycondensation increases, the speed of the reaction is more and more determined by the rate of the diffusion of the cleavage product from the surface of the polymer, and the stirring action is what determines the rate of such diffusion.

When the polyesters made by these known methods are fabricated to fibers, or injection-molded or extruded, the thermal stress that occurred during the condensation is manifested in a greater lowering of the average molecular weight, which has a negative influence on the physical properties of the plastic.

Even in the case of discontinuous production in modern horizontal reactors, the product quality is adversely affected by the relatively long time it takes to remove the product from the reactor. If the time it takes to empty the reactor amounts to 30 to 40 minutes, in the case of a polyester having a viscosity of $\eta_{red}$ 1.2, during this period the carboxyl group content is found to rise from 25 to 45 mass equivalents per kilogram. In the case of a polyester of a viscosity of $\eta_{red}$ 1.35, the carboxyl group content rises from 30 to 50 meq/kg. On the other hand, in a polyester of a viscosity of $\eta_{red} < 1$, no increase is observed in the carboxyl group content during the emptying period. With the product removing equipment known up to the present time in large autoclaves, it is not possible to reduce the emptying time to less than stated above. Experience shows that it is possible with the methods and apparatus known hitherto to prepare polycondensates with melt viscosities up to about 4500 poises, but in the case of further polycondensation in the melt to polycondensates of higher molecular weight, product deterioration due to thermal stress is impossible to avoid.

In the preparation of linear polycondensates of higher molecular weight, especially linear polyesters from dimethyl terephthalate and alkanediols, the melt condensation is generally discontinued at viscosities of $\eta_{red}$ 1 to 1.2, corresponding to about 2500 to 4500 poises in the melt, depending on the temperature of the preparation process.

If higher viscosities are to be achieved, it has hitherto been customary to discharge the condensate melt from the reactor through nozzles to form strands, and to subject the cooled condensate, in the form of granules or powders of a particle size of 0.001 to 10 mm, to a solid-phase condensation. Such a process is described, for example, in German Offenlegungsschrift No. 2,315,272.

In the known continuous method of preparing polyethyleneterephthalate of high molecular weight for the production of fibers, films and the like, the process is performed in stages: the transesterification in as many as 5 stages, the preparation of the precondensate in as many as 3, and the final condensation in the melt in as many as 2, depending on the desired final viscosity. For example, in German Offenlegungsschrift No. 1,920,954, a multistage method is described for the preparation of a polyester of a medium degree of polycondensation, in which the bis-(2-hydroxyethyl) terephthalate is first prepared in a separate step. This transesterification product is made to flow, in a second step, downwardly through a series of heated reaction zones situated one above the other, while the reaction mixture is led onto each liquid surface such that the condensate is set in rotation on the tray beneath it. The precondensate thus formed ($\eta_{red}$ 0.5 to 0.7) is then condensed to the end in a separate reactor in a third process step.

Methods for the further condensation of precondensates, in which the reaction mass is exposed to the reaction conditions in a thin layer, are described, for example, in German Offenlegungsschrift Nos. 1,745,541 and 2,060,341, and in German Auslegeschrift No. 1,645,641. In these the reaction is performed in vertical or horizontal polycondensation reactors in which the reaction mass is exposed to the reaction conditions in a thin layer, with removal of the cleavage products, by means of a stirrer which has on its shaft, which is parallel to the tank axis, wheels spaced vertically apart and equipped with openings and scoops, individual reaction zones being provided.

In spite of the multistage process technique, polycondensates, especially polyesters of the high molecular weights that are needed in the industrial field, are not condensed all the way to the end in the melt. The melt condensation, in the preparation of polyalkyleneterephthalates of high molecular weight, is discontinued at reduced viscosities of 0.8 to 0.9 (e.g., German Offenlegungsschrift No. 2,244,664). For the achievement of polyalkyleneterephthalates of higher molecular weight, the further condensation is performed in the solid phase. A method for the solid-phase condensation of polyesters is described, for example, in German Offenlegungsschrift No. 2,315,272.

In the continuous methods for the preparation of polyesters it is stressed that the apparatus are capable mechanically of handling melts with viscosities of more than 4500 poises. Nevertheless, the limits of the known apparatus with regard to the chemistry of the processes are much lower.

SUMMARY OF THE INVENTION

The problems above-discussed are solved in accordance with the present invention which provides a continuous process whereby polycondensates of high molecular weight are improved having improved characteristics, the process being carried out in virtually a single step.

Broadly the present invention contemplates an improvement in the method of preparing a linear polycondensate of high molecular weight wherein a precondensate is initially formed and thereafter subjected to melt condensation in a vacuum while cleavage products are removed therefrom, the reaction mass being exposed in a thin layer by means of a stirrer to the reaction conditions, the improvement residing in employing as the precondensate a molten precondensate having an average condensation degree of at least 3, said precondensate being introduced into the melt condensation zone continuously while cleavage products are driven off at 240°–280° C. especially 245°–255° C, the contents of the melt condensation zone being subjected to the action of a rotary stirrer until the melt has a melt viscosity of 1000 to 15000 poises and continuously withdrawing molten polycondensate in accordance with the speed of the reaction.

The present invention particularly contemplates the production of linear polycondensates having a melt viscosity of 4000 to 13000 poises.

The present invention further contemplates an apparatus for carrying out the precondensation of monomers which comprises a vertically disposed heatable preliminary reactor having a plurality of chambers disposed vertically one over the other, means for feeding the contents thereof to the next lower chamber, means for maintaining a normal or elevated pressure on the contents of a plurality of upper chambers, means for maintaining a partial vacuum on the contents of lower chambers, the chambers provided with means for maintaining normal or elevated pressure provided with a common exhaust gas stock, at least some of said chambers equipped with rotary stirrer means.

The apparatus for effecting melt polycondensation of a precondensate in one-step which comprises a substantially horizontally disposed vessel whose longitudinal axis is horizontal, said vessel containing therewithin a stirrer rotatably disposed in the reactor interior and having stirrer elements extending circumferentially and longitudinally and adapted to the interior shape of said vessel, a flue opening in gaseous fluid communication with the interior of said vessel for removal of cleavage products, an inlet connection adjacent one end of said vessel and an outlet connection adjacent the other end having at least one withdrawal auger therein, means for rotating said stirrer and said auger, said outlet connection flaring toward the interior of said vessel to form a funnel, said auger extending into said funnel.

The process of the invention in susceptible of broad and general application to reactions in fluid phase which take place in a range of apparent melt viscosities up to 15000 poises. It is especially suitable for the preparation of linear polycondensates of high molecular weight, polyesters and the like, especially saturated polyesters prepared from terephthalic acid or its esterifiable derivatives, such as dimethylterephthalates, and alkanediols of the formula $HO-(CH_2)_n-OH$ wherein n represents a whole number from 2 to 8, especially 2 to 4. In general, in the preparation of the polyester, up to 40 mole-% of the terephthalic acid units and/or diol units can be replaced by other conventional polyester-forming aromatic and/or aliphatic dicarboxylic acids and ester-forming derivatives, and by other diols, as the case may be.

The process of the invention is especially well suited for the preparation of polytetramethyleneterephthalates from esters of terephthalic acid, especially from dimethylterephthalate and butanediol-1,4, with the simultaneous use, if desired, of up to a total of 40 mole-% of other polyester-forming components. As it is known, a sufficiently high reaction speed is particularly important especially in the production of polycondensates of this kind, since such polycondensates, due to their thermal sensitivity, must be exposed only briefly to the relatively high reaction temperatures which are used in polycondensation in the melt.

Surprisingly, it has been found that polycondensates of especially good quality and of high molecular weights can be produced by setting out, in the process of the invention, from continuously prepared precondensates.

The continuous preparation of oligomeric alkyleneterephthalates from dimethylterephthalate (DMT) and a diol having 2 or more carbon atoms is described in the unpublished German patent applications Nos. P 25 04 156.9 and P 25 04 258.4. In the latter process, dimethylterephthalate and a diol of 3 or more carbon atoms, in a molar ratio of 1 : 1.1 to 1 : 1.5, preferably 1 : 1.2 to 1 : 1.4, are fed with a catalyst continuously into the uppermost chamber of a heated preliminary reactor consisting of a plurality of interconnected chambers disposed vertically one over the other, the transesterification reaction is performed at temperatures increasing from tray to tray, under normal pressure, and then, to initiate condensation, the excess diol is driven off at a still higher temperature and appropriate vacuum in other directly connected or separate chambers, until the desired average degree of condensation of 3 to 8 is reached, and the preliminary condensate is removed in portions or preferably continuously.

For the continuous production of the precondensates used in the method of the invention, an apparatus is accordingly preferably used which is constructed as a vertically disposed, heatable preliminary reactor designed for downward flow and having a plurality of chambers disposed one over the other and provided with a common exhaust stack and at least in part with stirring means, these chambers being under normal or excess pressure, and having also one or more vacuum chambers following them.

The heating can be performed by heating elements mounted on the inside or outside. The number of chambers in the normal pressure or overpressure part is governed by the amount to be produced, and can amount to from 3 to 10, and in larger columns to as much as, say, 30. The exhaust stack common to these chambers is located preferably centrally in the vertical axis of the reactor, where the stirrer shaft preferably common to the chambers and provided with stirrers preferably for every chamber, is also located. The depth of fill amounts generally to from 15 to 100 cm, preferably 25 to 60 cm; overflow tubes extending through each chamber bottom provide for the transport of material into the chamber below it.

Separately from the normal pressure or overpressure part, or preferably under same, there are disposed one or more additional heatable chambers of the vacuum part, which can also be equipped with a plurality of chambers, common exhaust stacks and stirrers on a common shaft, as well as overflow pipes extending through the column trays or running to the outside.

Surprisingly, a molten precondensate prepared continuously in this manner and having, for example, reduced viscosities of 0.2 to 0.25 dl/g, will have a higher reactivity than entirely discontinuously prepared products not only during the discontinuous further condensation in the melt to reduced viscosities of 0.9 to 1.0 dl/g, but also during solid-phase condensation. Furthermore, it has been found that precondensates prepared continuously in this manner can be further condensed in one step in the melt by the method of the invention, in the apparatus of the invention which is described below, to reduced viscosities of 1.4 to 1.7, without encountering the disadvantages hitherto encountered in the case of polyesters of high molecular weight prepared in the melt. By the method of the invention one can prepare polyesters of high molecular weight combined with low carboxyl group contents of about 5 to about 30 meq/kg, especially of 10 to 20 meq COOH/kg. By the method of the invention, viscosity ranges and product characteristics are achieved such as are necessary for thermoplastically fabricated polycondensates, especially for polytetramethylene terephthalates to be fabricated by the injection molding process, for example.

In a manner similar to that described above for the continuous preparation of the oligomeric polytetramethylene terephthalates, the preparation of other oligomeric esters can also be performed, especially the preparation of other oligomeric alkyleneterephthalates. In the preparation of the oligomeric alkyleneterephthalates, the diol component can be, for example, alkanediols of the formula

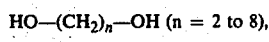
HO—(CH$_2$)$_n$—OH (n = 2 to 8), such as ethylene glycol, for example. The dicarboxylic acid component can be aromatic dicarboxylic acids such as, for example, terephthalic acid, or its dialkyl esters, preferably dimethylterephthalate, or mixtures of aromatic dicarboxylic acids, preferably mixtures of terephthalic and isophthalic acid, or of DMT and isophthalic acid, or of DMT and isophthalic acid dimethyl esters, preferably in a molar ratio of 95 : 5 to 60 : 40. If desired, a part of the isophthalic acid can be replaced by an aliphatic dicarboxylic acid such as adipic acid, sebacic acid and the like. The diols can also be glycol mixtures, e.g., 1,4-butanediol mixed with 1,6-hexanediol. If desired, a branched diol, such as neopentyl glycol, for example, can be used concomitantly in low proportions, of, for example, up to 10 mole-%.

An analogous procedure can also be followed in the preparation of precondensates from amide-forming components for the preparation of, for example, polyamides of high molecular weight on a terephthalic acid basis, for example by using an aminolysis product prepared continuously as described above by aminolysis, and subjecting it to further condensation by the procedure of the invention.

In the procedure of the invention, the transesterification, prepared preferably by continuous transesterification, is generally fed continuously to the post-reactor, and, by the production of a vacuum of less than 100 Torr, preferably less than 10 Torr, a polycondensation is performed at elevated temperature, by stirring at a speed of 1 to 10, preferably 3 to 8 rpm, with the simultaneous removal of cleavage products such as tetrahydrofuran, water, butanediol-1,4, until melt viscosities are achieved of preferably 4000 to 13000 poises.

The catalysts are best added beforehand, during the transesterification. Preferably, tetraalkyltitanates are used, preferably tetrabutyltitanate and/or tetra-(2-ethylhexyl)-titanate. The amounts of catalyst are desirably such that the titanium content will amount to from 80 to 120 ppm of the finished polyester. In some cases, other substances known to act as transesterification or esterification catalysts can be used, alone or concomitantly, such as zinc salts or manganese salts and the like.

In the melt condensation by the method of the invention, the temperatures will generally be between 150° and 300° C., preferably 200° to 270° C., but in any case above the melting range of the system involved.

In the continuous preparation of the precondensates which are used preferentially in the process of the invention, the components are exposed to higher temperatures as their degree of transesterification progresses, such temperatures being between 130° and 245°C., preferably between 150° and 235°C., depending on the nature of the reactants and on the catalyst system. In general, the temperature at the beginning of the transesterification in the uppermost chamber will be from 130° to 160° C., and it will increase to 180° to 235° C. in the bottommost chamber of the normal-pressure stage.

The alcohol and easily volatile by-products which are liberated in the transesterification, along with a portion of the diol used for the transesterification which will depend on the temperature and pressure conditions, are continuously withdrawn from all chambers under normal pressure or overpressure through a common, preferably central vapor stack, while preventing them from mixing with the downwardly flowing reaction mixture, and they are delivered to a superimposed or adjacent rectifier unit for the separation of methanol and the recovery of the diol and its separation from water and by-products such as tetrahydrofuran. The reaction part and the rectification part of the apparatus operate under the same pressure, which amounts to a maximum of 4 bars of overpressure, but is preferably equal to the atmospheric pressure. The diol produced by the separation in the sump of the rectifier can be recycled directly to the upper chamber of the reaction part of the apparatus, and also, if desired, divided among the chambers that follow.

In the case of catalyst systems which tend to form by-products, or do not exclude their production, provision is made for the maintenance of the molar ratio that is desired for the reaction or is favorable thereto by replacing the diol removed with the methanol by a corresponding amount of fresh diol, which is introduced into the chambers.

The transesterification product, which leaves the reaction part of the apparatus that is operating at normal pressure or overpressure, is fed through an appropriate regulating means which assures the maintenance of the desired retention time, into another part of the fore-reactor of the invention which operates at temperatures of, generally, 180° to 250°C., preferably 220° to 240°C., and can consist also of at least one, or several, chambers. If more than 2 chambers the vacuum is lowered step by step from chamber to chamber. Although not limited to specific values, and although it depends on the size and number of the chambers, the pressure generally amounts to 300 to 20 Torr, preferably 250 to 50 Torr.

These vacuum-chambers also can be equipped with stirrers, preferably mounted on a common shaft. In some cases the vacuum chambers following the normal pressure or overpressure part are not equipped with stirrers. This is possible because here the viscosity of the precondensate is still low, and the excess diol remaining in the transesterification mixture is still great enough, and, in addition, the introduction of an inert gas will produce sufficient turbulence for the rapid outgassing of the diol. If more than one or two vacuum chambers are present, it is desirable to provide for stirring beginning in the third chamber.

The oligomers prepared by this process, such as, for example, oligomeric tetramethylene terephthalates, are products of superior purity. Oligomeric esters have an extensive and assuredly high degree of transesterification, with a $CH_3O$ content of less than 0.05 wt.-%, and a free carboxyl group content of less than 30 meq/kg. The achievable reduced viscosity is repeatable as well as variable within relatively wide limits, and is generally less than 0.3, and preferably between 0.08 and 0.25. The content of monomeric terephthalic acid dialkanediol ester in the process of German Patent Application No. P 2504 156.9 is generally low, at 0.5 to 20 wt.-%, but it can amount to as much as, say, 30 wt.-%.

An oligomeric prepared continuously in this manner is preferably withdrawn continuously and subjected to melt condensation in the apparatus of the invention. In the melt condensation in the apparatus of the invention, polyalkyleneterephthalates or polyalkylenetereisophthalates, for example, can be prepared easily in reduced viscosities of up to about 1.7. The claimed process yields very repeatable characteristics and properties in the polycondensates, and enables the production of polycondensates of high molecular weight and high purity.

For the performance of the process of the invention, the known horizontal reactors are used, which have a reactor housing with a horizontal or approximately horizontal long axis and a stirrer rotatably disposed within the reactor and having stirrer elements extending circumferentially and longitudinally which are adapted to the interior shape of the housing. These reactors have a stack aperture for the removal of cleavage products, an inlet for the molten precondensate adjacent one end, and an outlet for the polycondensate adjacent the other end.

In these known apparatus, however, the proper withdrawal of the highly viscous polycondensate melt obtained by the process of the invention presents considerable difficulty or, under certain circumstances, is downright impossible, even when at least one withdrawal auger, directed preferably vertically downward, is provided in the outlet pipe. To avoid these difficulties, provision is made in accordance with the invention to construct the reactor such that the cross-section of the outlet pipe will flare towards the interior of the reactor to form a funnel, and the internal end of the withdrawal auger extends into this funnel. This entails the advantage that the forward portion of the withdrawal auger is immersed in the supply of melt that is in the funnel and draws it therefrom at a uniform rate of flow. The diameter of the funnel at the entrance into the reactor is at least twice as great as the diameter of the funnel in the unflared portion.

To promote the driving of the highly viscous polycondensate into the funnel by the revolving stirrer, the funnel, as seen in vertical cross sections, is, according to a further proposal of the invention, offset laterally from the vertical transverse axis of the reactor, in the direction of rotation of the stirrer. The outlet pipe is preferably directed vertically downwardly, although it can also be directed downwardly at an angle. With the outlet pipe thus disposed asymmetrically in relation to the funnel leading into it, it furthermore proves to be advantageous to construct the funnel, as seen in vertical cross section, with one portion of the wall, on the side farthest from the vertical transverse axis of the reactor, extending parallel or approximately parallel to the withdrawal auger, so that the polycondensate driven into the funnel will not, upon encountering this wall portion, be driven back upwardly into the reactor, but will instead be forced against the withdrawal auger. To reduce still further the possibility that the highly viscous melt might be drawn back upwardly out of the funnel, the stirrer elements revolving past the funnel can be made with a smaller diameter than the other stirrer elements.

In the process of the invention it is advantageous to proceed by introducing the precondensate, which has been collected in heated leveling bottles for example, continuously into the reactor by means of a metering pump, at a rate, for example, of 15 to 50 parts per hour. Alternatively, one can provide for a continuous flow from the leveling bottles or from the final chamber of the preliminary reactor through a reducing station preceded by a level control.

In general, the process is performed with the following conditions prevailing in the reactor: Internal temperature, e.g., in the case of the further condensation of an oligomeric tetramethyleneterephthalate, 240° to 260° C. In the case of other precondensates, the temperatures can also be higher: for example, 270° to 290° C. in the production of polyethyleneterephthalate. The temperature of the withdrawal means will be generally about the same as the internal temperature of the reactor. It is desirable to provide a vacuum in the reactor of less than 10, and preferably of 0.2 to, say, 2.5 Torr.

The desired final viscosity can be adjusted, for example, by varying the vacuum and/or the rotatory speed of the reactor stirrer. Thus, a reduced viscosity of 1.4 to 1.5 dl/g is achieved at a vacuum of 0.4 to 0.6 Torr and a rotatory speed of 6.3 revolutions per minute (in the preparation of polytetramethylene terephthalate). A reduced viscosity of 1.0 to 1.2 dl/g can be obtained, for example, at a vacuum of 1.5 to 2 Torr and a rotatory speed of 9.5 revolutions per minute.

The speed of the withdrawal auger is governed according to the amount and melt viscosity of the product being withdrawn, and according to the speed of the reaction. The flow of the polycondensate from the reactor and that of the molten precondensate entering into the reactor are so coordinated with one another that the fill level of the reactor remains constant or virtually constant during the continuous production.

In the preparation of polytetramethylene terephthalate of a reduced viscosity of, for example, 1.5 dl/g, the rotatory speeds of the withdrawal auger are between 15 and 22 revolutions per minute, for example.

It is desirable to regulate the feed of the precondensate and the withdrawal of the polycondensate such that the reactor will be filled to about 33 to 45% of its volumetric capacity. For example, into a reactor of a capacity of 160 liters, approximately 19.5 liters of a molten precondensate are introduced per hour until there are 55 to 60 liters of melt in the reactor, the melt taking up 37% of the volumetric capacity of the reactor. After this volume of fill is reached, about 17.5 to 18.5 kg per hour of post-condensed product of a reduced viscosity of 1.5 dl/g,. for example, is withdrawn through a perforated die and a cooling bath in a continuous strand, which is then granulated.

The cleavage products produced during the post-condensation, such as butanediol-1,4 for example, are drawn off through a vapor flue and precipitated in a receiver.

If the polycondensates withdrawn from the reactor are to be treated with additives, such as, for example, strengthening fillers such as glass fibers, flameproofing agents, light stabilizers, crystallization accelerators and the like, the melt can be delivered without preliminary solidification into a preferably short, single-screw or double-screw plasticizer-mixer where it will be compounded continuously with commonly or separately proportioned additives, before it is passed through a die of any desired type, preferably a nozzle plate, and formed into strands, cooled in a water bath, and chopped into granules. Preferably, the plasticizer-mixer is provided with a degassing zone just ahead of the nozzle plate. In this advantageous embodiment, the additional thermal stress involved in the remelting of the granules is avoided. The process steps of cooling, granulating and drying need then be performed only once.

Inorganic powders of grain sizes less than 5 microns, such as talc for example, in amounts of 0.02 to 0.5 wt.-%, can be added as crystallization accelerators. Such molding compositions ae especially suitable for injection molding. Glass fibers, of a length of 5 mm for example, can generally be incorporated in amounts of up to 40 wt.-% preferably up to 30 wt.-%, and in the production of glass-fiber reinforced polytetramethylene terephthalate, for example, it is preferable to use polycondensates having a reduced viscosity of about 1.1 to 1.5. Suitable for injection molding compositions without the addition of glass fibers are preferably polycondensates, especially polytetramethylene terephthalate, having a reduced viscosity of $\eta_{red}$ 1.4 to 1.7, especially 1.5.

For fireproofing, appropriate flameproofing agents compatible with the plastic in question can be incorporated by compounding in amounts of 5 to 20 wt.-% preferably 8 to 15 wt.-%.

The melt polycondensation in the reactor of the invention is generally stopped at melt viscosities of, say, 13000 to 15000. This melt viscosity corresponds in the case of polytetramethylene terephthalate to a reduced viscosity of approximately $\eta_{red}$ 1.5 to 1.7. If polycondensates of higher molecular weight are to be prepared, it is desired in the case of polyesters, especially polyethylene terephthalates, polypropylene terephthalates or polytetramethylene terephthalates, to perform the final condensation in the solid phase by known methods, such as the method described in German Offenlegungsschrift No. 2,315,272, to final viscosities of from 1.7 to 3, for example. In this method, for example, granulated or powdered polyester is heated at temperatures of 5° to 30°C., preferably 5 to 20°C., below their melting point for 5 to 30 hours under an inert gas shield, such as nitrogen and/or at a vacuum under 10 Torr, and the solid-phase condensation is performed up to reduced viscosities of 3.0, preferably up to 2.0.

The reduced viscosities in the case of polyesters are calculated according to the following formula. The measurement was performed at 25° C. The concentration of the solution was 1 gram per 100 milliliters, and the solvent was a mixture of 60 wt.-parts of phenol and 40 wt.-parts of 1,1,2,2,-tetrachloroethane:

$$\eta_{red} = (\eta/\eta_0 - 1) \times 1/c$$

$\eta$ = viscosity of the solvent; $\eta_o$ = viscosity of the slution;

$c$ = concentration of the solution.

The reduced viscosities of the above-named polyamides are measured on 0.5 wt.-% solutions in sulfuric acid at 20° C.and calculated according to the above formula.

The apparatus for the practice of the method of the invention is illustrated by an embodiment shown in the drawing, and will be further explained with the aid of same.

Figure 2:
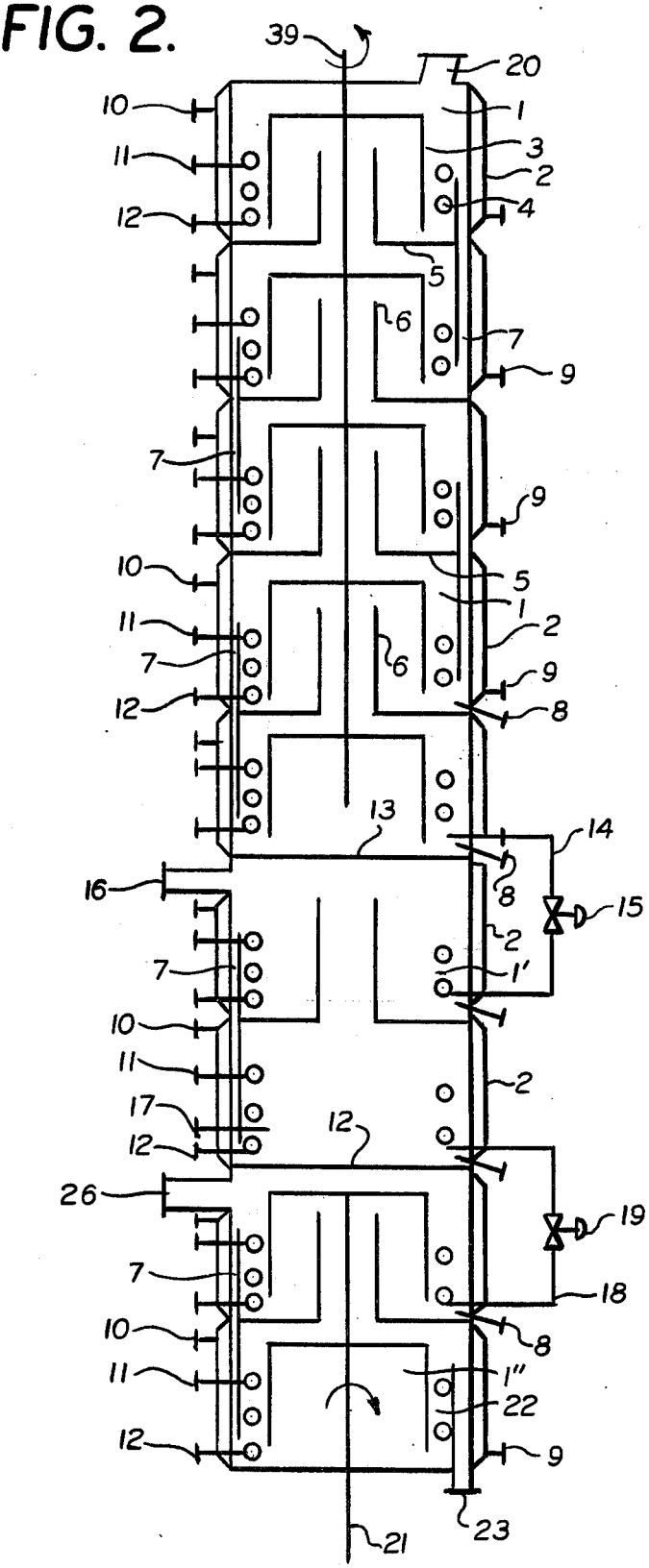
Figure 4:
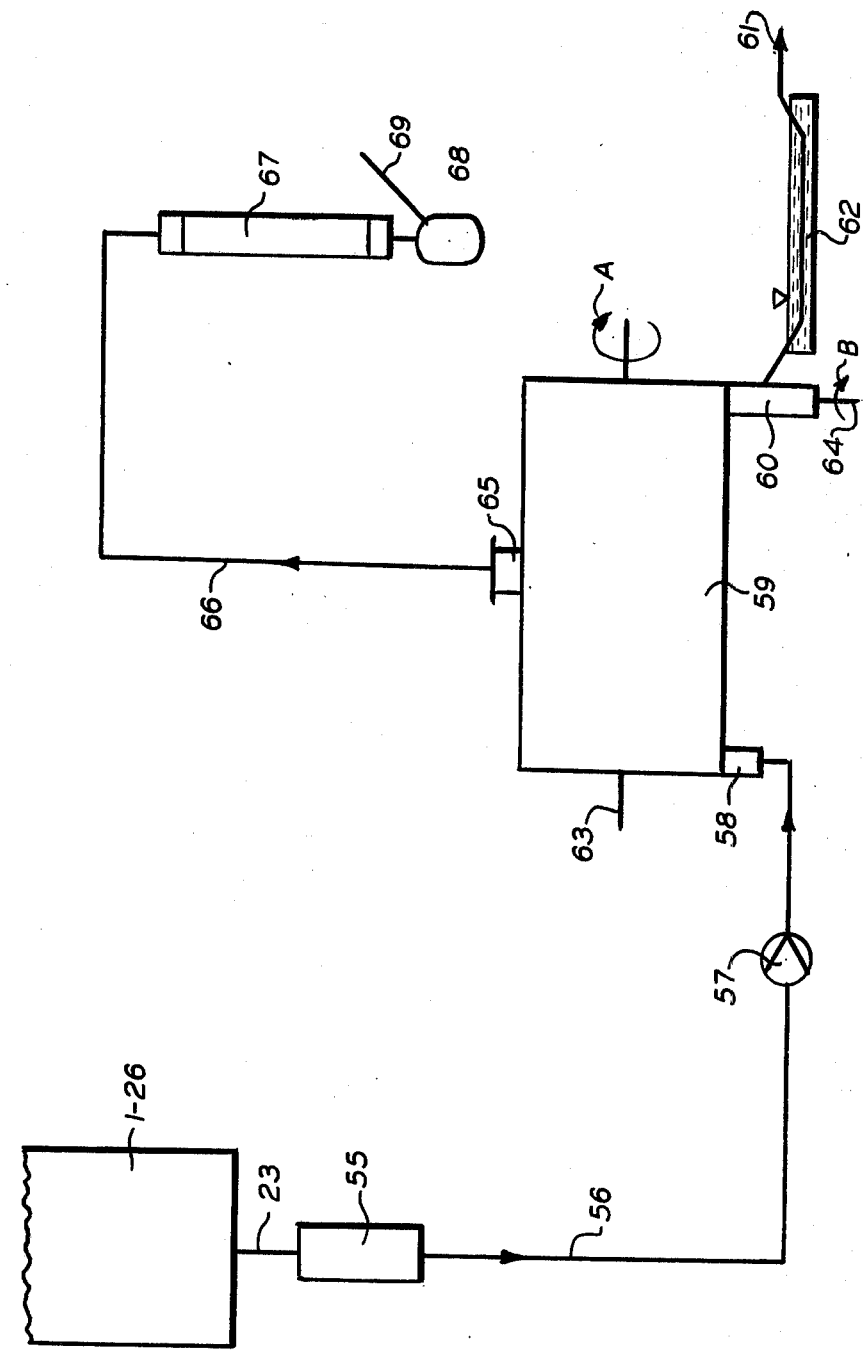
Figure 5:
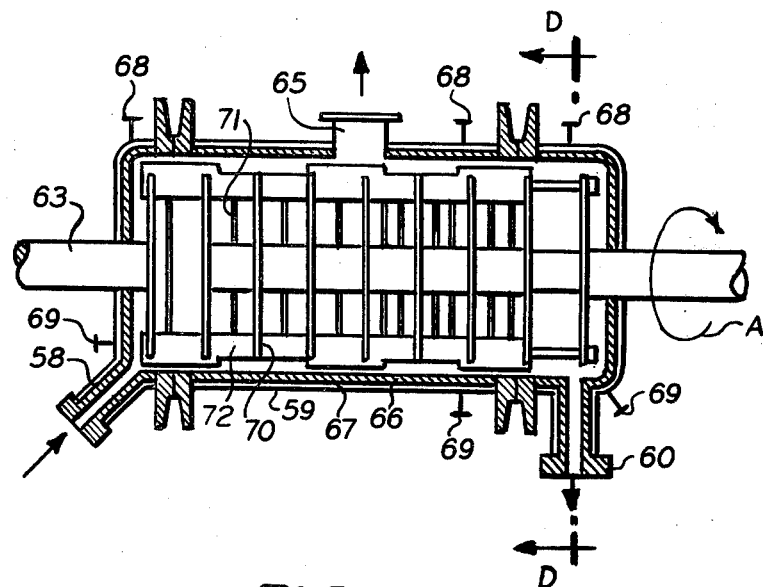
Figure 7:
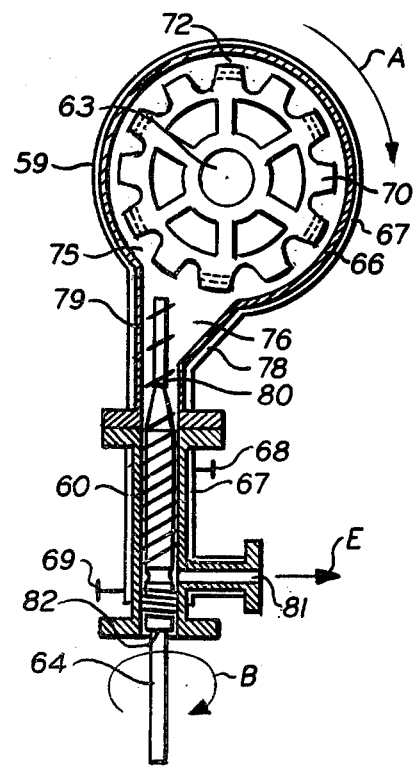

FIG. 1 shows the apparatus for the continuous production of the precondensate, represented diagrammatically, FIG. 2 is a diagrammatic representation of the preliminary reactor with a plurality of trays, FIG. 3 is a diagrammatic representation of one tray of the preliminary reactor with stirrer, FIG. 4 represents diagrammatically the apparatus for the preparation of the polycondensate, FIG. 5 is a diagrammatic cross-sectional plan view of the reactor, FIG. 6 shows a variety of stirrer elements for the reactor, FIG. 7 is a vertical cross sectional view of the withdrawal system of the reactor.

The apparatus represented in FIG. 1 has the preliminary reactor 1 to 26. In the preparation of polyesters, as an example, DMT and the diol or a mixture of the two is heated to melt the DMT in the vessels 30 equipped with the stirrers 31, and pumped by the proportioning pumps 32 through the suction lines 33 and the discharge line 34 into the upright, horizontally segmented preliminary reactor 1 to 26 in the preselected ratio. For the sake of simplicity, the heating system in the preliminary reactor has been omitted. Through the feed tank 37 and a melting system, which is not shown, catalyst is fed through line 38 to the uppermost tray of the preliminary reactor. Under the influence of heat and the stirrers, which are fastened to the common stirrer shaft 39, methanol is liberated, and is fed together with diol and DMT sublimate through the vapor flue 20 to the 40 with 40with dephlegmator 41. Diol and DMT are returned through line 46 and can be reintroduced into the process through lines 47 at various points on the preliminary reactor. methanol vapor is fed through line 42 to the heat exchanger 43 where it is totally condensed and then delivered through flow meter 44 to the receiver 45. The reaction mixture flows through connecting tubes 7 (FIG. 2) to the next tray underneath, where the reaction is continued at a higher temperature level. If desired, a stabilizer can be fed from tank 48 through a metering device, which is not shown, to, for example, the uppermost vacuum tray of the preliminary reactor.

By the application of a vacuum to the vacuum line 54, the diol is passed through vapor flue 16 and line 50 to the condenser 51, where it is condensed and fed through line 52 into the receiver 53 and measured. To increase the degree of condensation, the oligomer mixture can be fed through level control 19 and line 18 to another preliminary reactor part where it will be exposed to a still higher vacuum and still higher temperatures. The vapors of the diol are fed through connection 26 and line 27 to the condenser 28, where it is condensed and collected through line 29 in the measuring receiver 35. The vacuum is produced on line 36 by a pump which is not shown. Since the development of diol vapors diminishes and the precondensate becomes more viscous as the degree of condensation increases, a stirrer shaft 21 is also provided in this part of the preliminary reactor.

As seen in FIG. 2, the preliminary reactor 1 to 26 has a plurality of cylindrical chambers 1 with stirrers 3 and external heating jacket 2 with its inlets 9 and outlets 10. The cylindrical sections are defined at their bottom by trays 5 above which an internal coil 4 can be disposed, with the inlet and outlet connections 11 and 12, to increase the heating area. The vaporous substances that are liberated pass upwrdly through the exhaust stack 6 directly to the vapor flue 20, thereby preventing interaction with the reaction mixture. Some of the trays are provided with sampling taps 8.

The bottommost tray 13 of the normal-pressure or over-pressure part of the preliminary reactor is closed, i.e., has no exhaust stack. The mixture of transesterification product and oligomer is carried down to the first vacuum chamber 1' of the preliminary reactor through line 14 and level control 15. Vapors are removed through connection 16 and condensed separately from the normal-pressure or high-pressure part. In this portion of the preliminary reactor no stirring mechanism is required on account of the low viscosity and the vigorous evolution of gas. If necessary, the turbulence can be increased by the introduction of inert gas through line 17. In the vacuum section 1'' equipped with an agitator, which can follow the first vacuum section 1' if desired, the number of trays with the stirrers 22 and the common stirrer shaft 21 will depend on the desired degree of condensation. Vapors are removed through flues 26 and the reaction product is withdrawn from the preliminary reactor through tube 23.

In FIG. 3, a chamber 1 with stirrer 3 is illustrated on a larger scale; the valve 24 serves for the draining of the preliminary reactor. Thermometer receptacles 25 are provided in the chambers 1 for thermometers to record the temperature and/or to serve as controls for the heating circuits of the individual trays or groups of trays.

As shown in FIG. 4, the molten precondensate is fed from the preliminary reactor 1 to 26 through line 23, the equalizing vessel 55, line 56, proportioning pump 57 and the inlet 58 into the reactor 59. The polycondensate continuously produced in the reactor is ejected through the outlet 60 as a highly viscous melt in the form, for example, of strand 61, which is cooled in water bath 62 and fed to a granulator, for example, which is not shown. The reactor 59 has the stirrer 63 whose shaft rotates in the sense of arrow A, while the single-shaft vertically disposed withdrawal auger 64 disposed at the outlet 60 rotates in the sense of the arrow B. The vaporous and gaseous cleavage products released by the reaction are removed from reactor 59 through the flue connection 65 and carried through flue 66 to a condenser 67 where they are condensed and collected in the receiver 68. The receiver 68 is connected by line 69 to a vacuum system which is not shown. If it should prove advantageous in a particular case, provision can also be made within the scope of the invenion for the performance of the continuous polycondensation in, for example, two reactors 59 arranged in tandem, the melt then passing from the first reactor directly into the second and being withdrawn from the latter in the manner described above.

The reactor 59, as shown in FIG. 5, has the slantingly disposed inlet connection 58 at one end, and the outlet connection 60 directed vertically downwardly adjacent the other end. The outlet connection 65 for the cleavage products is provided on the top of the reactor 59. The periphery 66 of the reactor is surrounded by the heating jacket 67 with the heating fluid inlet 68 and outlet 69. The stirring elements 70 and 71 extending circumferentially and the stirring elements 72 extending longitudinally are disposed on stirrer shaft 70 which rotates in the direction of the arrow A.

In FIG. 6 there are shown a number of stirrer elements, the elements being represented in cross section at a and g. The rings b to e are provided with a wire mesh the size of whose openings will selected so as to be larger for the higher viscosities of the reaction mixture, i.e., will increase with proximity to the outlet 60. In the rings f and g there is nothing in the middle. In the cases of a and h the outermost rings are provided with radial arms 74, the ring h which is disposed adjacent the outlet 60 having a somewhat reduced outside diameter. The stirrer elements 70 in accordance with a, g and h are so disposed on the stirrer shaft 63 that they rotate in the direction of the arrow C.

FIG. 7 shows a cross-sectional view of the reactor 59, taken along line D—D of FIG. 5. The outlet connection 60 flares toward the interior 75 of the reactor to form the funnel 76, and is offset from the vertical transverse axis 77 of the reactor 59 in the direction of rotation A of the stirrer 63, i.e., it is eccentrically disposed. The wall portion 78 of the funnel 76 extends downwardly on a slant, while the opposite wall portion 79 farthest from the transverse axis 77 is disposed vertically, as is the withdrawal auger 64. A good driving of the highly viscous melts into the relatively large funnel and a steady flow towards the withdrawal auger 64 are thus assured, and the collapse of the vacuum prevailing in reactor 59 is prevented by the withdrawal mechanism. The withdrawal auger 64 rotating in the direction of arrow B extends with its leading portion 80, which is of reduced diameter, into the funnel 76 where it engages the polycondensate melt and drives it through the lateral outlet connection 81 in the direction of the arrow E, for example to a molding machine which is not shown.

At its rearward end, the withdrawal auger 64 is provided with the reverse driving helix 82, which together with a packing means, which is not shown, prevents the emergence of melt axially of the auger 64. The outlet 60, like reactor 59, is provided with the heating jacket 67 having heating fluid inlet 68 and outlet 69. Instead of the single-shaft withdrawal auger 64 as shown, it might be advantageous, especially in the case of very high viscosities, to provide, for example, two intermeshing augers, i.e., a self-cleaning double auger, equipped with means for controlling its output.

EXAMPLES

Examples 1 - 3

In replaceable tanks, 120.7 kg of dimethylterephthalate and 64.3 kg of butanediol-1,4 are placed in each, and heated in a nitrogen atmosphere at 140° C. The preliminary reactor used for the transesterification and precondensation is previously heated as follows:

Temperature of Tray 1 - 140° C. at 760 Torr,
2 - 140° C. at 760 Torr,
3 - 155° C. at 760 Torr,
4 - 170° C. at 760 Torr,
5 - 185° C. at 760 Torr,
6 - 200° C. at 75 Torr,
7 - 220° C. - 225° C. at 75 Torr.

In trays 6 and 7 a vacuum of 75 Torr is applied and the stirrer is set for 25 rpm. After the desired temperature is reached in the dissolving tank, a proportioning pump is used to pump the homogeneous dimethylterephthalate and butanediol-1,4 mixture into tray 1 of the column, 17.24 kg of dimethylterephthalate and 9.19 kg of butanediol-1,4 being fed in per hour. At the same time, a solution consisting of 0.0196 kg of butyl titanate and 0.18 kg of butanediol-1,4 is pumped per hour from the catalyst supply tank to the uppermost tray 1, and, by means of another proportioning pump, 1.7 kg of butanediol-1,4 is pumped per hour into the vapor chamber.

The transesterification mixture fills the column successively from tray 1 to tray 5, and from there it passes through a reducing station preceded by a level control, to fill trays 6 and 7, whereupon the transesterification reaction starts up. After about 7 hours, when all the trays are filled and the column is volumentrically in equilibrium, approximately 5 kg per hour of methanol is recovered from the top, and about 1.7 kg/h of butanediol-1,4 is recovered from trays 6 and 7. The transesterification product (precondensate), of a reduced viscosity of 0.19 dl/g, flows from tray 7 into a heated leveling bottle.

From there it is pumped continuously, by means of a proportioning pump, at a rate of 19.5 kg/h into the reactor described above. The operating conditions of the reactor are established as follows:

Internal temperature of reactor: 240°- 255° C.
Withdrawal auger temperature: 255°- 260° C.
Vacuum in the reactor: 0.2 - 2.5 Torr
Rotatory speed of disk stirrer in reactor: 6.0 - 10.0 rpm After the charge of condensation mixture in the reactor has reached a volume of 55 to 60 kg, approximately 17.5 to 18.5 kg per hour of post-condensed product having a reduced viscosity of 0.9 to 1.5 dl/g (see Table 1) is removed by means of the withdrawal auger through a perforated plate and a cooling bath in the form of a continuous strand, and is granulated. The desired final viscosity can be adjusted, for example, by varying the vacuum or the rotatory speed of the reactor stirrer. A reduced viscosity of 1.4 to 1.5 dl/g is reached, for example, at a vacuum of 0.4 to 0.6 Torr and a rotatory speed of 6.3 rpm. A reduced viscosity of 1.0 to 1.2 dl/g is reached, for example, at a vacuum of 1.5 to 2 Torr and a rotatory speed of 9.5 rpm.

The butanediol-1,4 as well as other cleavage products formed in the post-condensation are aspirated out through a vapor tube and precipitated in a receiver.

The polytetramethyleneterephthalate (PTMT) produced in Examples 1 to 3 has a glossy surface, and is white and has a high reactivity. The carboxyl group content is between 10 and 26 meq/kg, while products prepared by methods of the prior art have carboxyl group contents averaging 50 to 60 meq/kg.

Table 1

| | | Internal temp. of reactor | Vacuum in Torr | rpm | Contents of Reactor | Auger temp. | kg/h | COOH content in meq/kg |
|---|---|---|---|---|---|---|---|---|
| Example 1 | $\eta$red. 0.9 | 250° C. | | 6.2 | 54–58 kg | 255° C. | 17.8–18.0 | 10–12 |
| Example 2 | $\eta$red. 1.2 | 250° C. | 1.2–1.5 | 10(6) | 54–58 kg | 255° C. | 18 | 18–22 |
| Example 3 | $\eta$red. 1.5 | 250° C. | 0.5 | 6.2 | 54–58 kg | 260° C. | 18.3 | 22–26 |

EXAMPLE 4

In accordance with Example 1, 100.70 kg of dimethylterephthalate and 18.92 kg of dimethyl isophthalate, plus 64.2 kg of butanediol-1,4 were charged into the dissolving tank and, when the desired temperature of 140° C. was reached, 14.39 kg/h of dimethylterephthalate, 2.70 kg/h of dimethyl isophthalate and 9.19 kg/h of butanediol-1,4 were introduced into tray 1. At the same time, a solution of 0.0196 kg of butyltitanate in 0.18 kg of butanediol-1,4 was fed hourly from the catalyst supply tank to tray 1, and 1.7 kg of butanediol-1,4 was delivered hourly into the vapor chamber.

The temperatures and vacuum settings are similar to Example 1, as is the amount of recovered methanol and butanediol-1,4. The precondensate carried off into leveling bottles has a reduced viscosity of 0.186 dl/g. As in Example 1, 19–20 kg of precondensate is pumped into the reactor from the leveling bottle. The charge again amounts to 55–60 kg. The reaction conditions in the reactor are as follows:

Internal temperature of the reactor: 255° C.
Temperature of withdrawal auger: 255°–260° C.
Vacuum in the reactor: 6 Torr
Speed of disk stirrer in the reactor: 6.4 rpm Approximately 18 to 18.5 kg per hour of post-condensate in granular form is discharged through the auger, and has a reduced viscosity of 0.65 to 0.70 dl/g.

By the metering of, for example, 0.1 weight-part of talc per 100 weight-parts of polyester into the withdrawal auger, the recrystallization of the polyester melt can be accelerated.

EXAMPLE 5

In accordance with Example 2, 100.70 kg of dimethylterephthalate and 64 kg of butanediol-1,4 were charged into the tank and heated at 140° C. 14.93 kg of dimethylterephthalate and 9.19 kg of butanediol-1,4 were pumped hourly by means of the proportioning pump from the dissolving tank into tray 1. Between the proportioning pump and the entry to tray 1, an amount of 2.3 kg/h of isophthalic acid is fed into the product stream by means of a screw-type solids conveyor and delivered to tray 1. The catalyst solution and vapor chamber injection are handled as in Example 2. The reaction water that forms in the transesterification and esterification in trays 1 to 5, in contradistinction to Example 2, is driven off at the top with the methanol. The precondensate obtained is, as described in Example 2, pumped into the reactor, further condensed under the same conditions, and withdrawn after condensation in the same quality and amount.

EXAMPLE 6

As in Example 3, the following amounts were pumped into tray 1 in the manner described:
Solution:
  94.78 kg of dimethylterephthalate
  64.2 kg of butanediol-1,4
Feed to tray 1:
  13.54 kg/h of dimethylterephthalate
  9.19 kg/h of butanediol-1,4
  3.08 kg/h of isophthalic acid
Catalyst solution and injection of vapors as in Example 2.

The post-condensation is performed as described in Example 3.

EXAMPLE 7

The following are charged into the dissolver in the manner described in Example 1:
  120.0 kg of dimethylterephthalate
  64.8 kg of ethanediol After the dissolving temperature of 140° C. is reached, 17.14 kg/h of dimethylterephthalate and 9.26 kg/h of ethanediol are pumped, accordingly, into Tray 1. Additionally, the following was fed hourly through microvalves to tray 1: 0.0052 kg of zinc acetate dissolved in 0.2 kg of ethanediol, as catalyst, and 0.0018 kg of $H_3PO_4$ (60% acid) dissolved in 0.01 kg of ethanediol. The temperatures and pressures of trays 1-7 are adjusted as follows:
  Tray 1: 160 degrees C.
  Tray 2: 170 degrees C.
  Tray 3: 180 degrees C.
  Tray 4: 210 degrees C.
  Tray 5: 220 degrees C.
  Tray 6: 230 degrees C. 200 Torr
  Tray 7: 235 degrees C. 200 Torr 5.0 – 5.2 kg/h of methanol and 1.9 – 2.1 kg/h of ethanediol are recovered in the manner described in Example 1. The precondensate in the leveling bottle has a reduced viscosity of 0.10 to 0.11 dl/g.

As in Example 1, under otherwise identical conditions, 19 to 20 kg/h of precondensate are pumped from the leveling bottles into the reactor where they are further condensed. At an internal temperature of 275° C. and a vacuum of 0.9 to 1.2 Torr, 17 to 19 kg per hour of polyethyleneterephthalate is obtained in granular form, having a reduced viscosity of 1.0 to 1.2 dl/g.

Comparative Example 8

A PTMT which had been prepared by the discontinuous method described in German Offenlegungsschrift No. 1,420,515 by melt condensation to a reduced viscosity of 0.93 and which had a carboxyl group number of 44 meq/kg, was placed, in the form of granules prepared from a strand, in a tumble dryer, and further condensed at 209° C. in the solid phase, under a vacuum of 1 Torr, under simultaneous flooding with nitrogen. After 18 hours of detention time a viscosity of $\eta_{red}$ 1.63 was achieved.

EXAMPLE 9

A PTMT produced continuously in accordance with Example 2, and having a reduced viscosity of 1.2, was solid-phase condensed under the same conditions as described in Example 8. After the same detention time, a PTMT was obtained having an $\eta_{red}$. viscosity of 2.92. The color of this product was substantially brighter than the one of Example 8, where the PTMT had a decided yellowish tint.

What is claimed is:

1. In a method of preparing a linear polycondensate of high molecular weight wherein a precondensate is initially formed and thereafter subjected to an one-step melt condensation in a vacuum while cleavage products are removed therefrom, the reaction mass being exposed in a thin layer by means of a stirrer to the reaction conditions, the improvement which comprises employing as the precondensate a molten precondensate having an average condensation degree of at least 3, said precondensate being introduced into an one-step melt condensation zone continuously while the cleavage products are driven off at 240°–280° C., specially 245°–255° C., the contents of said melt condensation zone being subjected to the action of a rotary stirrer until the melt has a melt viscosity of 1000 to 15000 poises and continuously withdrawing molten polycondensate in accordance with the speed of the reaction.

2. A method according to claim 1 wherein the polycondensates that are withdrawn are those of 4000 to 13000 poises melt voscosity.

3. A method according to claim 1 wherein the precondensates which are continuously fed to the melt condensation zone are continuously produced.

4. A method according to claim 3 wherein said precondensates are continuously formed by introducing the condensation monomers thereof continuously into the uppermost chamber of an upright heatable preliminary reactor comprising a plurality of chambers connected to one another and disposed vertically one over the other, effecting transesterification, esterification in at least one chamber at normal or elevated pressure, permitting the contents of said chamber to pass to successive lower chambers maintained at higher temperature whereby to commence condensation, withdrawing volatile components therefrom in directly connected or separate chambers at further increased temperature until the desired condensation degree of at least 3 is achieved and continuously withdrawing precondensate.

5. A method according to claim 4 wherein the preconsensate is continuously introduced into an one-step melt condensation zone in molten state as it is formed.

6. A method according to claim 4 wherein the precondensate is prepared in the presence of a catalyst by transesterification of dimethylterephthalate and 1,4-butanediol in a molar ratio of 1:1.1 to 1:1.5, excess diol being driven off from the reaction mixture.

7. A method according to claim 6 wherein said molar ratio of dimethylterephthalate to 1,4-butanediol is 1:1.2 to 1:1.4.

8. A method according to claim 6 wherein said catalyst is a tetraalkyltitanate.

9. A method according to claim 8 wherein said catalyst is tetrabutyltitanate or tetra(2-ethylhexyl)-titanate.

10. A method according to claim 6 wherein the molten condensate withdrawn from the melt condensation zone is withdrawn by an auger and the molten pass is formed into a strand by coating.

11. A method according to claim 10 wherein at least one filter, reinforcing material, stabilizer or flameproofing agent is compounded with the resultant molten polycondensation product before it is cooled into a strand.

12. A method according to claim 10 wherein thereafter the cooled strand is granulated.

13. A method according to claim 1 wherein the precondensate has a condensation degree of 3 to 8.

14. A method according to claim 6 wherein in at least one of the lowermost chambers a vacuum or partial vacuum is applied to the contents thereof.

15. A method according to claim 6 wherein the number of chambers maintained at normal or elevated pressure is 3 to 10.

16. A method according to claim 15 wherein each of said chambers contains a stirrer and the contents thereof are stirred.

17. A method according to claim 6 wherein the molten precondensate has a reduced viscosity of 0.2 to 0.25 dl/g.

18. A method according to claim 4 wherein 1,4-butanediol is condensed with a mixture of terephthalic acid or its dimethyl ester and isophthalic acid or its dimethyl ester, the mole ratio of terephthalic acid or ester to isophthalic acid or ester being 95.5 to 60.40.

19. A method according to claim 4 wherein the melt condensation zone is maintained at a vacuum of less than 100 Torr.

20. A method according to claim 4 wherein the melt condensation zone is maintained at a vacuum of less than 10 Torr.

21. A method according to claim 19 wherein the contents thereof are stirred at a speed of 1 to 10 rpm.

22. A method according to claim 19 wherein the contents thereof are stirred at a speed of 3 to 8 rpm.

23. A method according to claim 21 wherein the temperatures of the melt condensation zone is 150° to 300° C.

24. A method according to claim 23 wherein the temperature of the uppermost chamber for the precondensation zone is 130° to 160° C. and the temperature increases to 180° to 235° C. in the bottommost chamber maintained at normal or elevated pressure.

25. A method according to claim 24 wherein the chambers of the precondensation zone maintained in a partial vacuum are maintained at 20 to 300 Torr.

26. A method according to claim 25 wherein the vacuum in said precondensation zone is lowered step by step from chamber to chamber.

* * * * *

UNITED STATES PATENT AND TRADEMARK OFFICE
CERTIFICATE OF CORRECTION

PATENT NO. : 4,138,544
DATED : February 6, 1979
INVENTOR(S) : Janssen et al.

It is certified that error appears in the above—identified patent and that said Letters Patent are hereby corrected as shown below:

Column 1, line 29, "to" should read -- at --.

Column 4, line 6, "in" should read -- is --.

Column 10, line 27, "slution" should read -- solution --.

Column 10, line 63, "melting" should read -- metering --.

Column 11, line 3, "methanol" should read -- Methanol --.

Column 13, line 51, "volumentrically" should read
           -- volumetrically --.

Signed and Sealed this

Nineteenth Day of June 1979

[SEAL]

Attest:

RUTH C. MASON
Attesting Officer

DONALD W. BANNER
Commissioner of Patents and Trademarks